US011180026B2

(12) United States Patent
Anand et al.

(10) Patent No.: US 11,180,026 B2
(45) Date of Patent: Nov. 23, 2021

(54) CIRCUIT DEVICE, ELECTRONIC DEVICE, AND VEHICLE

(71) Applicant: SEIKO EPSON CORPORATION, Tokyo (JP)

(72) Inventors: Kumar Anandabairavasamy Anand, Richmond (CA); Wittmeir Manfred, Aichach (DE); Jeffrey Eric, Richmond (CA); Tetsuo Kawamoto, Suwa (JP); Yasutoshi Akiba, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 69 days.

(21) Appl. No.: 16/720,174

(22) Filed: Dec. 19, 2019

(65) Prior Publication Data
US 2020/0198468 A1    Jun. 25, 2020

Related U.S. Application Data

(60) Provisional application No. 62/782,640, filed on Dec. 20, 2018.

(51) Int. Cl.
*B60K 35/00* (2006.01)
*G06T 3/60* (2006.01)
*G06T 7/00* (2017.01)
*G06T 7/13* (2017.01)

(52) U.S. Cl.
CPC ............ *B60K 35/00* (2013.01); *G06T 3/60* (2013.01); *G06T 7/0002* (2013.01); *G06T 7/13* (2017.01); *B60K 2370/1529* (2019.05); *B60K 2370/167* (2019.05)

(58) Field of Classification Search
None
See application file for complete search history.

(56) References Cited

U.S. PATENT DOCUMENTS

| 5,848,199 | A | 12/1998 | Naqvi |
| 9,811,932 | B2 | 11/2017 | Staudenmaier et al. |
| 10,795,777 | B1* | 10/2020 | Goyal ................. G06F 11/1004 |
| 2004/0123111 | A1* | 6/2004 | Makita .................. G06F 21/645 |
| | | | 713/176 |
| 2005/0157839 | A1* | 7/2005 | Altman .................. A61B 6/032 |
| | | | 378/4 |
| 2007/0047828 | A1* | 3/2007 | Ishii ...................... H04N 1/3935 |
| | | | 382/232 |

(Continued)

FOREIGN PATENT DOCUMENTS

| JP | H10-49665 | A | 2/1998 |
| JP | 2788365 | B2 | 8/1998 |

*Primary Examiner* — David H Chu
(74) *Attorney, Agent, or Firm* — Rankin, Hill & Clark LLP

(57) ABSTRACT

A circuit device includes an image processing circuit and a comparison circuit. The image processing circuit performs a first mapping process and a first rotation process on an input image to generate an image for a head up display. The image processing circuit performs, on an image, a second mapping process that is a reverse mapping process of the first mapping process and a second rotation process that is a reverse rotation process of the first rotation process to generate an image. The comparison circuit performs a comparison between the image and the image and outputs a result of the comparison as information for detecting an error in the image.

15 Claims, 11 Drawing Sheets

(56) References Cited

U.S. PATENT DOCUMENTS

| | | | |
|---|---|---|---|
| 2008/0088527 A1 | 4/2008 | Fujimori et al. | |
| 2011/0063452 A1* | 3/2011 | Fifis | G06F 3/14 348/180 |
| 2012/0050470 A1* | 3/2012 | Oba | G06F 3/04845 348/43 |
| 2013/0041214 A1* | 2/2013 | Maahs | A61B 1/05 600/104 |
| 2016/0307346 A1* | 10/2016 | Staudenmaier | G06T 3/0093 |

* cited by examiner

CIRCUIT DEVICE, ELECTRONIC DEVICE, AND VEHICLE

The present application is based on, and claims priority from U.S. Patent Application Ser. No. 62/782,640, filed on Dec. 20, 2018, the disclosure of which is hereby incorporated by reference herein in its entirety.

BACKGROUND

1. Technical Field

The present disclosure relates to a circuit device, an electronic device, a vehicle, and the like.

2. Related Art

A head up display (HUD) that displays information to a user's field of view in a superimposed manner by displaying an image on a transparent screen or the like is known. US-A-2016-0307346 discloses a method for verifying image data output to a head up display. In US-A-2016-0307346, a plurality pieces of input image data is integrated, a mapping process is performed on the integrated image data, the image data after the mapping process is output to a head up display, and validity of the image data output to the head up display is checked.

The head up display is mounted on, for example, a dashboard of an automobile, but there is a tolerance in a mounting angle of the head up display with respect to the dashboard or the like. Here, the mounting angle is a rotation angle in a direction in which a screen rotates around the line of sight as an axis, that is, a rotation angle with an axis intersecting the screen of the head up display as a rotation axis. Since a display image is inclined when the mounting angle of the head up display changes, the inclination of the display image is canceled by rotating the image in accordance with the inclination of the display image. US-A-2016-0307346 does not disclose a method for verifying image data when such an image rotation is performed.

SUMMARY

An aspect of the present disclosure relates to a circuit device including an image processing circuit and a comparison circuit. The image processing circuit performs a first mapping process and a first rotation process on an input first image to generate a second image for a head up display and performs, on the second image, a second mapping process that is a reverse mapping process of the first mapping process and a second rotation process that is a reverse rotation process of the first rotation process to generate a third image. The comparison circuit performs a comparison between the first image and the third image and outputs a result of the comparison as information for detecting an error in the second image.

DESCRIPTION OF EXEMPLARY EMBODIMENTS

Hereinafter, preferred embodiments of the present disclosure will be described in detail. In addition, the present embodiment to be described below does not unduly limit the contents described in the scope of the appended claims, and all the configurations to be described in the present embodiment are not necessarily essential components.

1. Circuit Device

Figure 1:
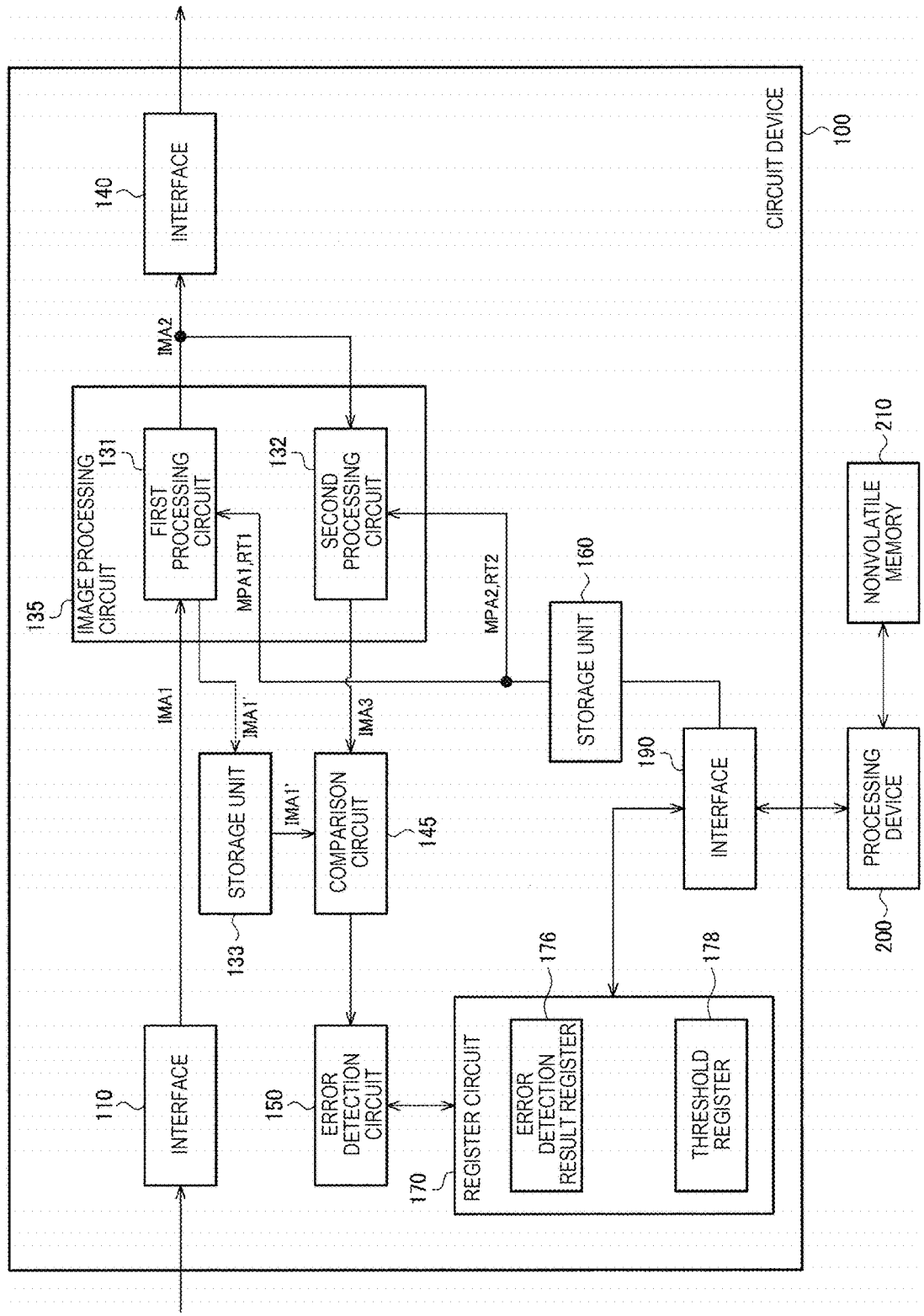
FIG. 1 is a configuration example of a circuit device according to a present embodiment.

FIG. 1 is a configuration example of a circuit device 100 according to the present embodiment. The circuit device 100 is a head up display controller that controls image display on the head up display. The circuit device 100 is an integrated circuit device referred to as an integrated circuit (IC). The circuit device 100 is an IC manufactured by a semiconductor process and is a semiconductor chip in which a circuit elements are formed on a semiconductor substrate.

The circuit device 100 includes an interface 110, a storage unit 133, an image processing circuit 135, an interface 140, a comparison circuit 145, an error detection circuit 150, storage unit 160, a register circuit 170, and an interface 190.

The interface 110 receives image data transmitted from a processing device 200 or the like to the circuit device 100, for example. The interface 110 converts the received image data into a format used inside the circuit device 100, and outputs the converted image data as an image IMA1. The image IMA1 is a first image. For example, the interface 110 is an open LVDS display interface (OpenLDI), and converts a serial signal received by low voltage differential signaling (LVDS) into an RGB parallel signal. The processing device 200 is, for example, a system on a chip (SoC), a micro control unit (MCU), or a central processing unit (CPU).

The image processing circuit 135 includes a first processing circuit 131 that maps an image in accordance with the surface shape of a display portion of the head up display, and a second processing circuit 132 that performs a reverse mapping on the image. The first processing circuit 131 is also referred to as a first warp engine, and the second processing circuit 132 is also referred to as a second warp engine.

Specifically, the first processing circuit 131 performs, on the image IMA1, a first mapping process using a first mapping information MPA1 and a first rotation process using a first rotation information RT1, and outputs an image IMA2 after the processes. The image IMA2 is a second image. The first processing circuit 131 extracts an image IMA1'. The image IMA1' is the image IMA1 or an image of the region of interest extracted from the image IMA1. Note that, both the image IMA1 and the image IMA1' that is a part of the image IMA1 are referred to as the image. The region of interest is also referred to as an ROI.

The display portion is a screen or display in the head up display. The screen is also referred to as a body to be projected. When the display portion is a screen, the head up display includes a projection device that projects the image IMA2 onto the screen. The projection device includes, for example, a liquid crystal display panel, a display driver that drives the liquid crystal display panel, a light source, and a lens. The display driver displays an image on the liquid crystal display panel based on the received image data, the light source outputs light to the liquid crystal display panel, and the light passing trough the liquid crystal display panel is projected onto the screen by the lens. The screen is a transparent object and has a reflecting surface that reflects the projected light. For example, in an in-vehicle head up display, the screen is a transparent screen mounted on a dashboard or a windshield of an automobile. When the display portion is a display, the head up display displays the image IMA2 on the display. The display is a transparent display using an organic EL panel, for example.

The second processing circuit 132 performs, on the image IMA2, a second mapping process using a second mapping information MPA2 and a second rotation process using a second rotation information RT2, and outputs an image IMA3 after the processes. The image IMA3 is a third image. When the image IMA1' is the image IMA1, the image IMA3 is an image obtained by performing a reverse mapping on the entire image IMA2. When the image IMA1' is an image of the region of interest extracted from the image IMA1, the image IMA3 is an image obtained by performing a reverse mapping on the image of the region of interest extracted from the image IMA2. Hereinafter, a case where the image IMA1' is an image of the region of interest extracted from the image IMA1 will be described as an example.

The interface 140 outputs the image IMA2 to the outside of the circuit device 100. The outside of the circuit device 100 is a display driver that drives a display panel of the head up display, for example. For example, the interface 140 is an LVDS interface, and converts an RGB parallel signal from the image processing circuit 135 into an LVDS serial signal.

The storage unit 133 is a first storage unit. The first processing circuit 131 stores the image IMA1' of the region of interest extracted from the image IMA1 in the storage unit 133. The storage unit 160 is a memory. For example, the memory is a semiconductor memory such as a RAM or a nonvolatile memory. In addition, the storage unit 133 and the storage unit 160 may each be configured with an individual memory, and may be configured with one memory.

The comparison circuit 145 performs a comparison process between the image IMA1' stored in the storage unit 133 and the image IMA3, and outputs a result of the comparison. The result of the comparison is used to detect an error in the image IMA2. That is, the result of the comparison is used to verify whether or not the first mapping process and the first rotation process performed by the first processing circuit 131 are normal. The comparison circuit 145 obtains an index indicating a similarity between the image IMA1 and the image IMA3. The index is a shape index or a visibility index to be described below. Alternatively, the comparison circuit 145 may obtain sum of squared difference (SSD), sum of absolute difference (SAD), normalized cross correlation (NCC), or the like as an index.

The error detection circuit 150 detects an error in the second image IMA2 by comparing the index with a threshold. The threshold is a threshold indicating the allowable degree of similarity that the image IMA1' and the image IMA3 can have.

When an error is detected by the error detection circuit 150, the image processing circuit 135 stops outputting the image IMA2 to the interface 140. Alternatively, when an error is detected by the error detection circuit 150, the interface 140 stops outputting the image IMA2. The interface 140 may output the image IMA2 together with the error information, and the display driver that has received the error information may perform an operation based on the error information. Alternatively, the interface 190 may output the error information to the processing device 200, and the processing device 200 that has received the error information may perform an operation based on the error information. The error information is, for example, an error determination flag or an index. The operation based on the error information is, for example, a display stop of the head up display.

The interface 190 performs inter-circuit communication between the circuit device 100 and processing device 200. For example, the interface 190 is a serial communication interface such as a serial peripheral interface (SPI) method or an I2C method. Setting information and control information from the processing device 200 are written in, for example, the register circuit 170, and the circuit device 100 performs an operation according to the setting information and control information.

The register circuit 170 is configured to be accessible from the processing device 200 via the interface 190. The register circuit 170 includes an error detection result register 176 and a threshold register 178.

The error detection result register 176 stores an error detection result output from the error detection circuit 150. The error detection result is, for example, an error determination flag indicating whether or not the display image is determined to be an error. The processing device 200 can determine whether or not an error has occurred by reading the error detection result from the error detection result register 176 via the interface 190.

A threshold is set in the threshold register 178 from the processing device 200 via the interface 190. The error detection circuit 150 compares the index and the threshold set in the threshold register 178 to detect an error.

The storage unit 160 is a second storage unit. The storage unit 160 stores the first mapping information. MPA1, the second mapping information MPA2, the first rotation information RT1, and the second rotation information RT2. Specifically, the processing device 200 transmits MPA1, MPA2, RT1, and RT2 to the interface 190, and the storage unit 160 stores the MPA1, MPA2, RT1, and RT2 received by the interface 190. The image processing circuit 135 performs a mapping process and a rotation process based on the MPA1, MPA2, RT1, and RT2 read from the storage unit 160. The storage unit 160 is, for example, a memory or a register.

For example, the memory is a semiconductor memory such as a RAM or a nonvolatile memory.

The image processing circuit 135, the comparison circuit 145, and the error detection circuit 150 are logic circuits. The image processing circuit 135, the comparison circuit 145, and the error detection circuit 150 may be configured as individual circuit, or may be configured as an integrated circuit by automatic placement and routing. In addition, some or all of these logic circuits may be implemented by a processor such as a digital signal processor (DSP). In this case, a program or instruction set describing the function of each circuit is stored in the memory, and the function of each circuit is realized by the processor executing the program or instruction set.

Although the circuit device 100 includes the error detection circuit 150 and the error detection result register 176 in FIG. 1, the circuit device 100 may not include the error detection circuit 150 and the error detection result register 176. In this case, the interface 190 may output the index obtained by the comparison circuit 145 to the processing device 200, and the processing device 200 that has received the index may detect an error by comparing the index with the threshold. When the processing device 200 detects an error, the processing device 200 may perform an error handling operation such as display stop of the head up display.

Figure 2:
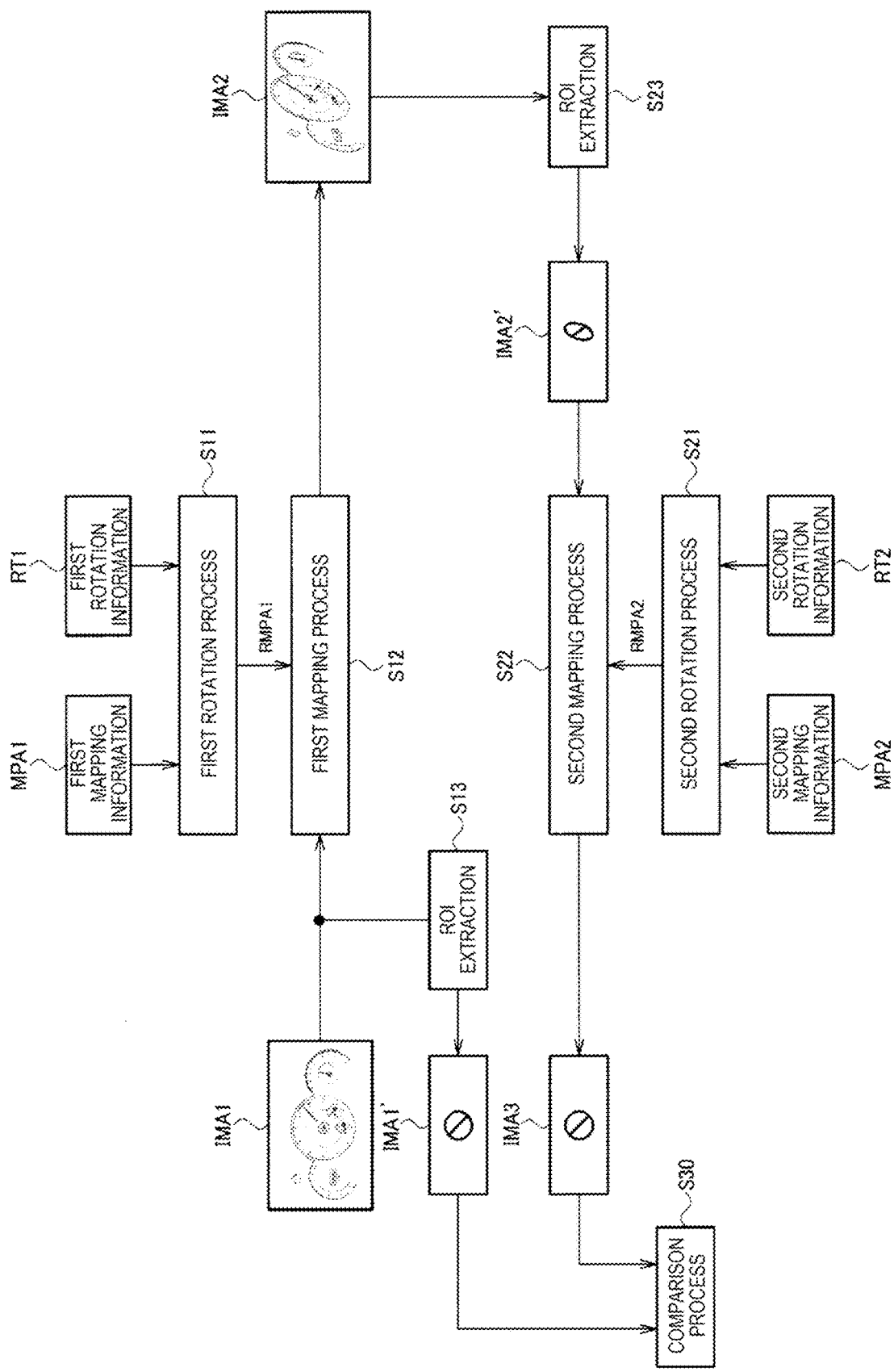
FIG. 2 is a diagram for describing a first operation example of the circuit device according to the present embodiment.

FIG. 2 is a diagram for describing a first operation example of the circuit device 100 according to the present embodiment.

In a first rotation process S11, the first processing circuit 131 generates mapping information RMPA1 by rotationally converting the first mapping information MPA1 by using the first rotation information RT1. The first mapping information MPA1 is a map table in which source coordinates and target coordinates are associated with each other. The first rotation information RT1 is information that defines rotation conversion of the coordinate system. The first processing circuit 131 rotationally converts the source coordinates or the target coordinates based on the first rotation information RT1. The converted map table is the mapping information RMPA1.

In a first mapping process S12, the first processing circuit 131 maps the image IMA1 to the image IMA2 by using the mapping information RMPA1. The mapping process is also referred to as a warp process. Since the rotation-converted mapping information RMPA1 is used, an image rotation is performed together with mapping.

The first mapping process S12 performs coordinate conversion that associates a position on the image IMA1 with a position on the display portion to convert the image IMA1 into the image IMA2. The coordinate conversion is defined by a map table. The first processing circuit 131 is a forward warp engine or an inverse warp engine. When the first processing circuit 131 is a forward warp engine, the first mapping information MPA1 is a forward map table, and when the first processing circuit 131 is an inverse warp engine, the first mapping information MPA1 is an inverse map table. The inverse warp engine is also referred to as a reverse warp engine, and the inverse map table is also referred to as a reverse map table.

The forward warp is a conversion that moves each pixel of an input image to the warp engine to any position in an output image. The forward warp engine is a warp engine having a forward warp function. The forward map table is a table in which each pixel of the input image is associated with a destination coordinate corresponding to each pixel. Alternatively, the forward map table is a table in which each pixel of the input image is associated with a relative movement amount to the destination coordinate corresponding to each pixel. The inverse warp is a conversion that obtains each pixel of the output image of the warp engine from a pixel at any position in the input image. The inverse warp engine is a warp engine having an inverse warp function. The inverse map table is a table in which each pixel of the output image is associated with a reference source coordinate corresponding to each pixel. Alternatively, the inverse map table is a table in which each pixel of the output image is associated with a relative movement amount from the reference source coordinate corresponding to each pixel.

The first mapping process S12 is a process of deforming the image IMA1 so that the image displayed on the display portion of the head up display appears undistorted when viewed from the user. In a case where the display portion has a curved surface, when an undistorted image is displayed on the display portion, the image appears distorted to the user due to the curved surface. The image is deformed so as to cancel the distortion. Alternatively, the image may be distorted when the image is projected on the display portion. In this case, similarly, the image is deformed so as to cancel the distortion. As described above, since the image IMA2 is an image obtained by deforming the undistorted image IMA1, the image IMA2 is a distorted image.

When there is an abnormality in the first rotation process S11 or the first mapping process S12, the image IMA1 is not normally converted into the image IMA2. When such an error is detected, an error cannot be accurately detected even if the deformed image IMA2 and the original image IMA1 are simply compared. Therefore, in the present embodiment, the image comparison is performed after the image IMA2 is reverse-mapped. The reverse mapping and image comparison will be described.

As shown in S13, the first processing circuit 131 extracts the ROI from the image IMA1 and outputs the image IMA1' after the extraction. For example, a region to be verified whether the display is normal in the image displayed on the head up display is defined as ROI. In an in-vehicle head up display, the ROI is a region including an icon such as a warning light.

As shown in S23, the second processing circuit 132 extracts the ROI from the image IMA2 and outputs an image IMA2' after the extraction. The ROI in the image IMA2 is a region corresponding to the ROI in the image IMA1.

In a second rotation process S21, the second processing circuit 132 generates mapping information RMPA2 by rotationally converting the second mapping information MPA2 by using the second rotation information RT2 The second mapping information MPA2 is a map table in which source coordinates and target coordinates are associated with each other. The second rotation information RT2 is information that defines reverse rotation conversion of rotation conversion defined by the first rotation information RT1. That is, the rotation conversion defined by the second rotation information RT2 is the same as the rotation conversion defined by the first rotation information RT1 in terms of the center coordinate and an absolute value of a rotation angle, and is opposite to the rotation conversion defined by the first rotation information RT in terms of the rotation direction. The second processing circuit 132 rotationally converts the source coordinates or the target coordinates based on the second rotation information RT2. The converted map table is the mapping information RMPA2.

In a second mapping process S22, the second processing circuit 132 maps the image IMA2' to the image IMA3 by using the mapping information RMPA2. The image IMA3 is the third image. Since the rotation-converted mapping information RMPA2 is used, an image rotation is performed together with mapping.

The second mapping process S22 performs coordinate conversion that associates a position on the display portion with a position on the image IMA3 to convert the image IMA2' into the image IMA3. The coordinate conversion is defined by a map table and is the reverse conversion of the coordinate conversion in the first mapping process S12. The second processing circuit 132 is a forward warp engine or an inverse warp engine. When the second processing circuit 132 is a forward warp engine, the second mapping information MPA2 is an inverse map table, and when the second processing circuit 132 is an inverse warp engine, the second mapping information MPA2 is a forward map table.

The second mapping process S22 is a process of returning an image deformed in accordance with the display portion of the head up display to the undistorted image. When there is no abnormality in the processes performed by the first processing circuit 131 and the second processing circuit 132, the image IMA1' before mapping and the image IMA3 after mapping and reverse mapping are to be the same image. The comparison circuit 145 obtains an index indicating a similarity between the image IMA1' and the image IMA3. When the similarity indicated by the index is equal to or less than a threshold, the error detection circuit 150 determines that an error has occurred. In a case where the image IMA1' and the image IMA3 are similar to the extent that they do not affect the visibility of the image IMA2 even when the image IMA1' and the image IMA3 do not completely match with each other, the error detection circuit 150 determines that no error has occurred. The allowable degree of similarity is set by a threshold compared with the index.

In FIG. 2, the case where the first processing circuit 131 performs the rotation process on the first mapping information MPA1 based on the first rotation information RT1 and performs the mapping process on the image IMA1 by using the processed mapping information RMPA1 has been described as an example. However, the rotation process and the mapping process are not limited to this. Similarly, the rotation process and the mapping process performed by the second processing circuit 132 are also not limited to FIG. 2. For example, the first processing circuit 131 may perform the mapping process on the first image IMA1 by using the first mapping information MPA1, and perform the rotation process on the processed image based on the first rotation information RT1. The second processing circuit 132 may perform the rotation process on the image IMA2' based on the second rotation information RT2, and perform the mapping process on the processed image by using the second mapping information MPA2.

Figure 3:
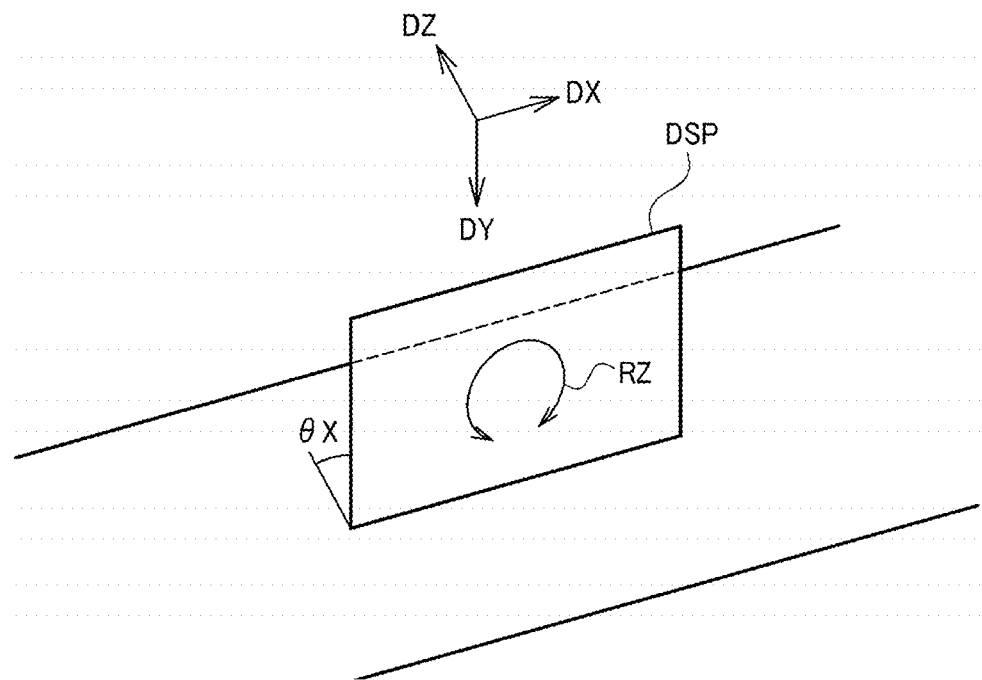
FIG. 3 is a diagram for describing a relationship between a mounting tolerance of a head up display and an image rotation.

FIG. 3 is a diagram for describing a relationship between a mounting tolerance of the head up display and the image rotation. In FIG. 3, a case where the head up display is installed on a dashboard of an automobile will be described as an example, but the installation place of the head up display is not limited to this.

A direction DZ shown in FIG. 3 is a direction orthogonal to a display portion DSP of the head up display. When the display portion DSP has a curved surface, the direction DZ and the display portion DSP are orthogonal to each other at any position of the display portion DSP. For example, the direction DZ and the display portion DSP are orthogonal to each other at the center of the display portion DSP. A direction DX is a direction orthogonal to the direction DZ, and a direction DY is a direction orthogonal to the direction DX and the direction DZ. The direction DX corresponds to the horizontal direction. That is, the direction DX is parallel to the horizontal plane when the automobile is in a horizontal posture. When the head up display is vertically installed on the dashboard of the automobile, the direction DY corresponds vertical direction, and the direction DY is perpendicular to the horizontal plane. However, the direction DY is not limited to the vertical direction, and the direction DY may be inclined with respect to the horizontal plane. That is, the head up display may be installed on the dashboard inclined in the depth direction.

Rotation RZ indicates rotation of the display portion DSP about the axis parallel to the direction DZ as a rotation axis. Due to the tolerance when the head up display is mounted on the dashboard, variation occurs in the rotation angle of the rotation RZ. It is assumed that the rotation angle when the tolerance is zero is 0 degrees, the clockwise rotation is positive, and the counterclockwise rotation is negative. When the rotation RZ of the display portion DSP is a positive rotation angle, the display image is rotated clockwise when viewed from the user. The first processing circuit 131 performs the rotation process on the image in the negative direction, that is, counterclockwise. As a result, even when the display portion DSP is inclined due to the tolerance, an image that is not inclined can be displayed when viewed from the user.

An inclination angle θX of the display portion DSP in the depth direction will be described when the interpolation process is described below.

Figure 4:
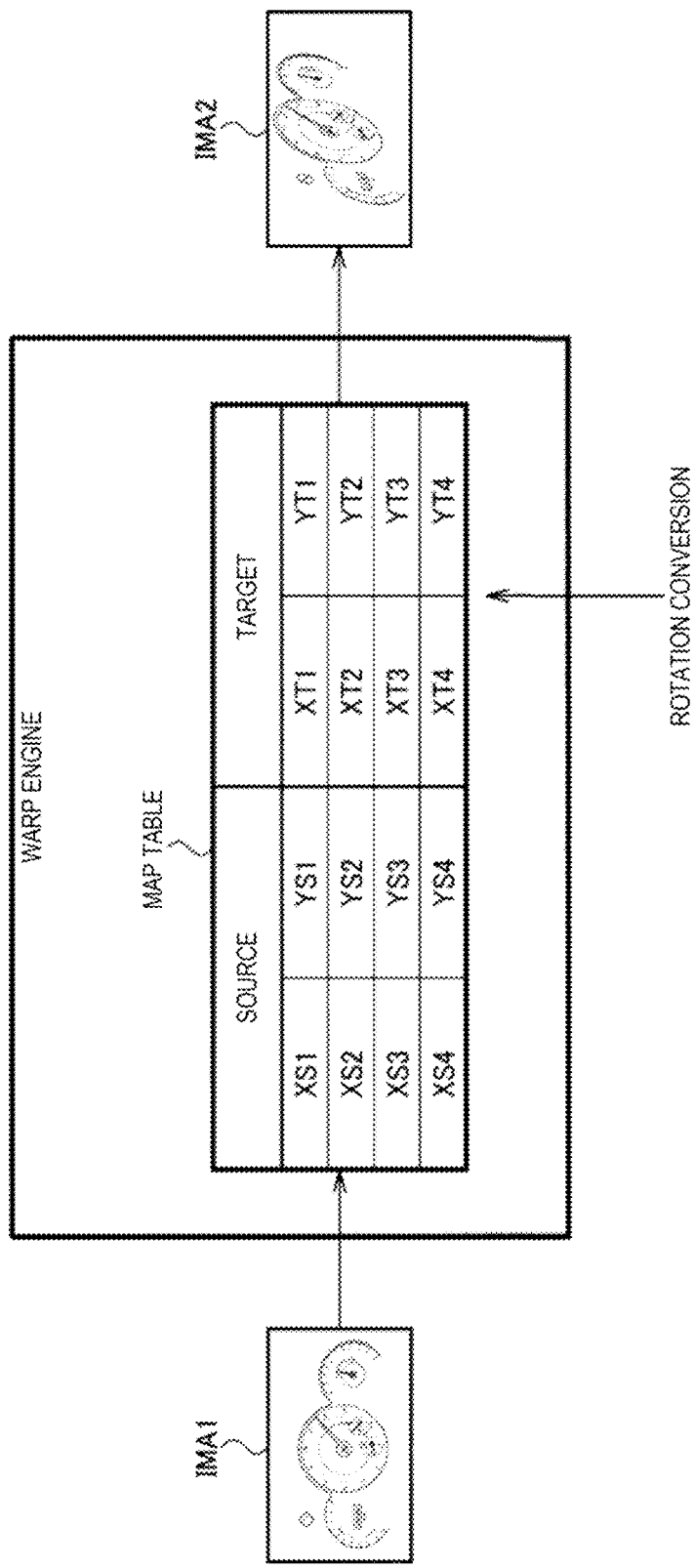
FIG. 4 is a diagram for describing details of a first rotation process.

FIG. 4 is a diagram for describing details of the first rotation process. In FIG. 4, a case where the first processing circuit 131 is a forward warp engine will be described as an example.

As shown in FIG. 4, the map table is a table in which source coordinates (XSi, YSi) are associated with target coordinates (XTi, YTi), i is an integer of 1 or more and 4 or less. In FIG. 4, coordinate conversion of four points is defined in the map table, but coordinate conversion of two or more points may be defined in the map table.

When the first processing circuit 131 is a forward warp engine, the map table is a forward map table. That is, the source coordinates (XSi, YSi) indicate the position in the image IMA1, and the target coordinates (XTi, YTi) indicate the position in the image IMA2. The first processing circuit 131 rotationally converts the target coordinates (XTi, YTi) in the map table in the first rotation process. That is, the coordinates indicating the position in the image IMA2 are rotationally converted. Even when the first processing circuit 131 is an inverse map engine, the coordinates indicating the position in the image IMA2 in the inverse map table are rotationally converted.

The rotation conversion is a conversion that rotates by a predetermined angle around the center coordinate in the XY coordinates. For example, the processing device 200 writes the first rotation information RT1 indicating a predetermined angle into the register circuit 170 via the interface 190. The first processing circuit 131 sets the predetermined angle by reading the first rotation information RT1 from the register circuit 170. The predetermined angle includes information on the absolute value of the rotation angle and the rotation direction.

Similarly, in the second rotation process, the second processing circuit 132 rotationally converts coordinates indicating the position in the image IMA2 in the map table.

In the present embodiment described above, the image processing circuit 135 performs the first mapping process and the first rotation process on the input image IMA1 to generate the image IMA2 for the head up display. The image processing circuit 135 performs, on the image IMA2', the second mapping process that is the reverse mapping process of the first mapping process and the second rotation process that is the reverse rotation process of the first rotation process to generate the image IMA3. The comparison circuit 145 performs the comparison between the image IMA1' and the image IMA3 and outputs the result of the comparison as information for detecting an error in the image IMA2.

According to the present embodiment, even when the image displayed on the head up display is rotated, it is possible to verify whether the rotated image is appropriate. That is, since the image processing circuit 135 performs, on the image IMA2', the reverse mapping process of the first mapping process and the reverse rotation process of the first rotation process, when the image IMA2 is normal, the image IMA3 is to return to the same image as the image IMA1'. The comparison circuit 145 can output information for detecting the error of the image IMA2 by comparing the image IMA3 and the image IMA1'.

In the present embodiment, the comparison circuit 145 compares the image IMA1 and the image IMA3 in the region of interest. That is, as described with reference to FIG. 2, the first processing circuit 131 extracts the image IMA1' of the ROI from the image IMA1. In addition, the second processing circuit 132 extracts the image IMA2' of the ROI from the image IMA2, and performs the second mapping process and the second rotation process on the image IMA2 ' to output the image IMA3. That is, the image IMA3 is the image of the ROI. The comparison circuit 145 compares the image IMA1' of the ROI and the image IMA3 of the ROI.

According to the present embodiment, error detection can be performed only for the region of interest in the image displayed on the head up display. The region of interest is a region in which content with high importance is displayed in the display image, for example. As a result, the processing load on the image processing circuit 135 and the comparison circuit 145 can be reduced. That is, by comparing the image IMA1' and the image IMA3 in the region of interest, the processing load on the comparison circuit 145 can be reduced as compared to the case where the entire image is compared. In addition, the second processing circuit 132 performs the second mapping process and the second rotation process on the image IMA2' in the region of interest, such that the processing load on the second processing circuit 132 can be reduced as compared to the case where the entire image is processed.

2. Reduction Process and Enlargement Process

In FIG. 2, the image processing circuit 135 does not perform a reduction process and an enlargement process on the image. However, as will be described with reference to FIGS. 5 to 7 below, the image processing circuit 135 may perform the reduction process on the image, or the reduction process and the enlargement process on the image. Hereinafter, description of the operation already described in FIG. 2 and the like will not be repeated.

Figure 5:
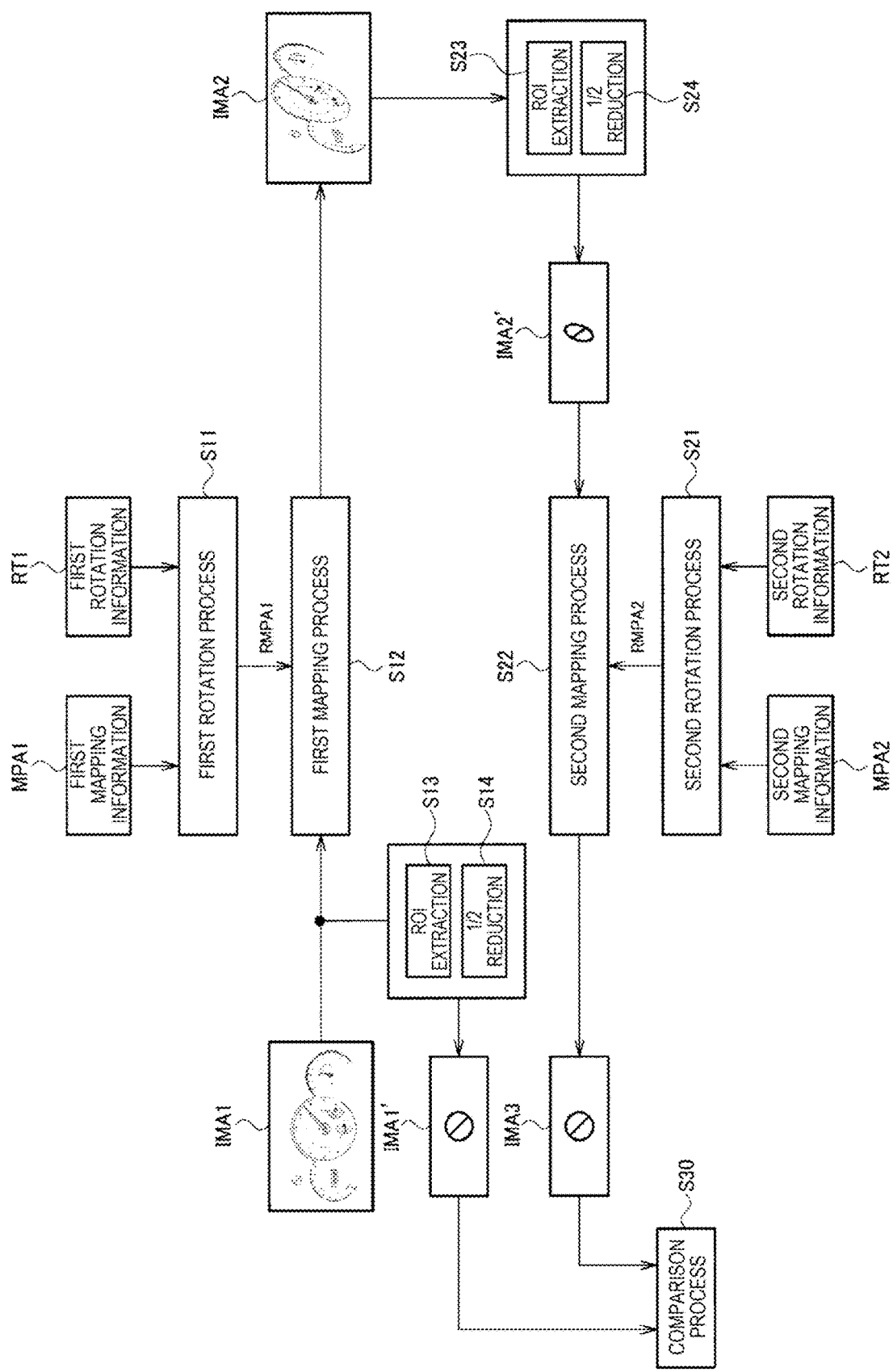
FIG. 5 is a diagram for describing a second operation example of the circuit device according to the present embodiment.

FIG. 5 is a diagram for describing a second operation example of the circuit device 100 according to the present embodiment. The first processing circuit 131 extracts the image of the ROI from the image IMA1 as shown in S13, performs the reduction process on the image of the ROI to ½ size as shown in S14, and outputs the image IMA1' after the reduction process. The reduction process is a process of reducing the number of pixels of an image, that is, a process of downsampling the image. Note that, the order of reduction and ROI extraction may be reversed. That is, the first processing circuit 131 may perform the reduction process on the image IMA1, extract the image of the ROI from the image after the reduction process, and output the extracted image IMA1' of the ROI.

The second processing circuit 132 extracts the image of the ROI from the image IMA2 as shown in S23, performs the reduction process on the image of the ROI to ½ size as shown in S24, and outputs the image IMA2 after the reduction process Since both the image IMA' and the image IMA3 are reduced to ½ size, the image IMA1' and the image IMA3 have the same size. As in the case of the first processing circuit 131, the order of reduction and ROI extraction may be reversed.

Figure 6:
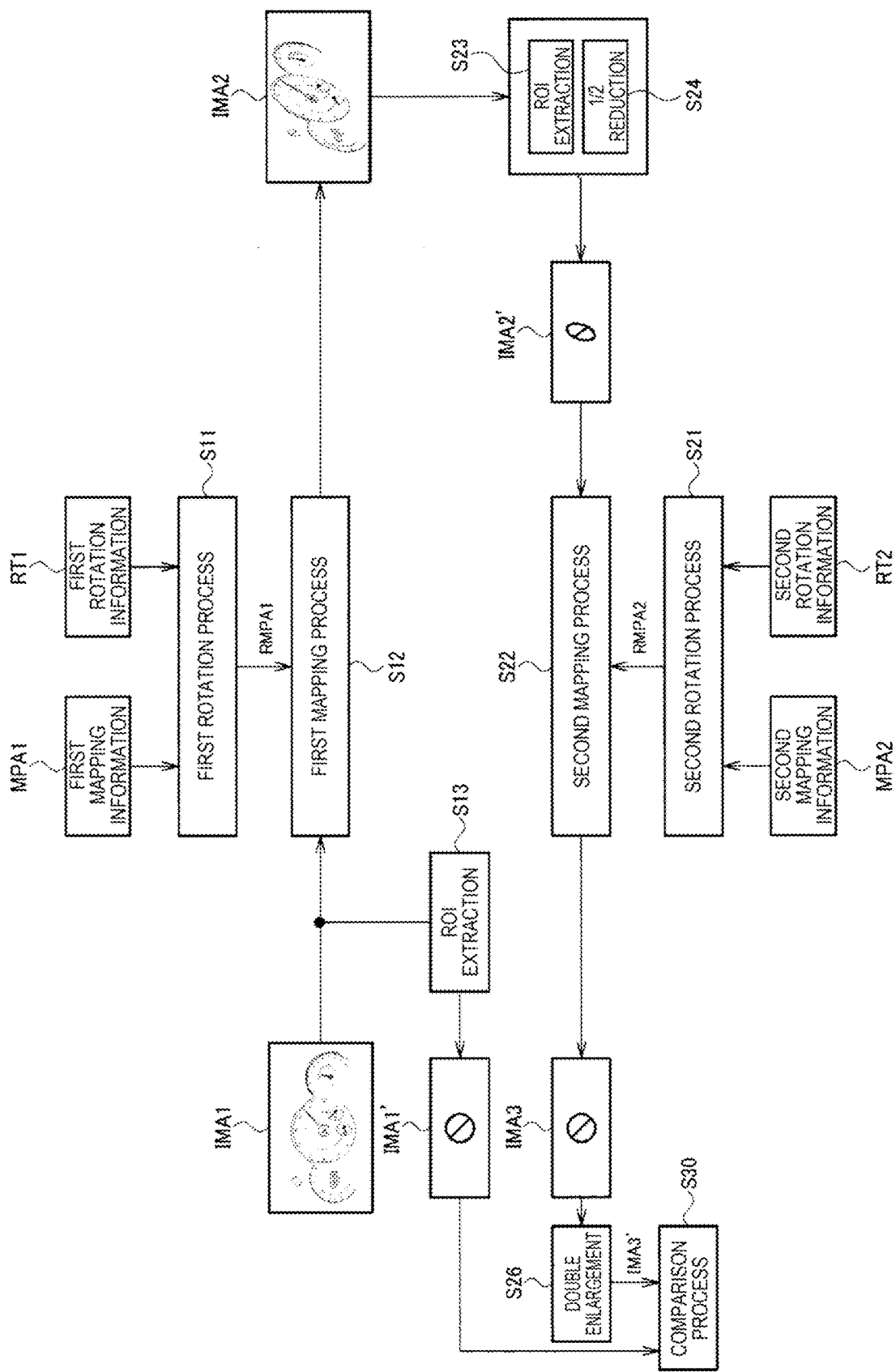
FIG. 6 is a diagram for describing a third operation example of the circuit device according to the present embodiment.

FIG. 6 is a diagram for describing a third operation example of the circuit device 100 according to the present embodiment. In FIG. 6, the first processing circuit 131 performs only ROI extraction in S13 and does not perform ½ reduction. The second processing circuit 132 performs the ROI extraction process in S23 and the ½ reduction process in S24. In addition, as shown in S26, the second processing circuit 132 performs an enlargement process of doubling the image size of the image IMA3, and outputs an image IMA3' after the enlargement process. The comparison circuit 145 compares the image IMA1 and the image IMA3. The image IMA3' has the same size as the image IMA1' by the ½ reduction process in S24 and the double enlargement process in S26.

Figure 7:
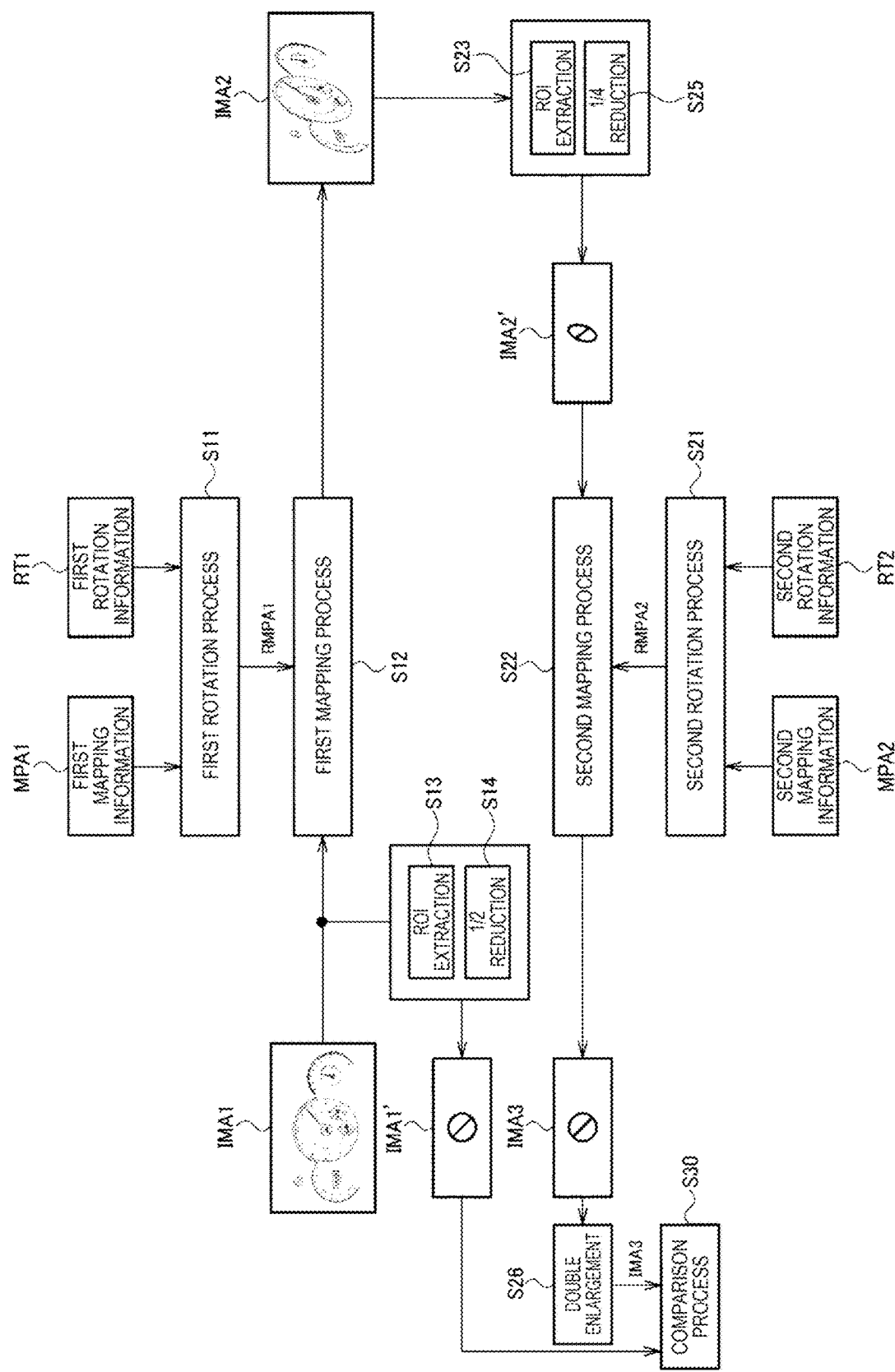
FIG. 7 is a diagram for describing a fourth operation example of the circuit device according to the present embodiment.

FIG. 7 is a diagram for describing a fourth operation example of the circuit device 100 according to the present embodiment. In FIG. 7, the first processing circuit 131 performs the ROI extraction process in S13 and the ½ reduction process in S14. The second processing circuit 132 extracts the image of the ROI from the image IMA2 as shown in S23, performs the reduction process on the image of the ROI to ¼ size as shown in S25, and outputs the image IMA2' after the reduction process. The second processing circuit 132 performs the double enlargement process in S26. Since the image IMA1' is an image reduced to ½ size and the image IMA3 is an image reduced to ¼ size and doubled, the image IMA1 and the image IMA3 have the same size.

According to the embodiment of FIGS. 5 to 7 described above, the second processing circuit 132 performs the second mapping process and the second rotation process on the image IMA2' reduced to ½ size or ¼ size. Therefore, the processing load on the second processing circuit 132 can be reduced as compared to the case where the reduction process is not performed. In addition, according to the embodiment of FIGS. 5 and 7, since the comparison circuit 145 compares ½ reduced size images, the processing load on the comparison circuit 145 can be reduced as compared to the case of comparing original size images.

3. Map Table Interpolation Process

A process of interpolating a map table according to an inclination angle of a display surface of the head up display will be described. First, the inclination angle of the display surface in the depth direction will be described with reference to FIG. 3.

As shown in FIG. 3, a surface on which an image is displayed in the display portion DSP is a display surface. An angle formed by the display surface and a reference plane is an inclination angle $\theta X$ of the display surface in the depth direction. The reference plane is, for example, a horizontal plane, but is not limited thereto. As the display surface rotates about an axis parallel to the direction DX as the rotation axis, the inclination angle $\theta X$ changes. The inclination angle $\theta X$ may be fixed or variable. For example, the user may be configured to be able to adjust the inclination angle $\theta X$.

Figure 8:
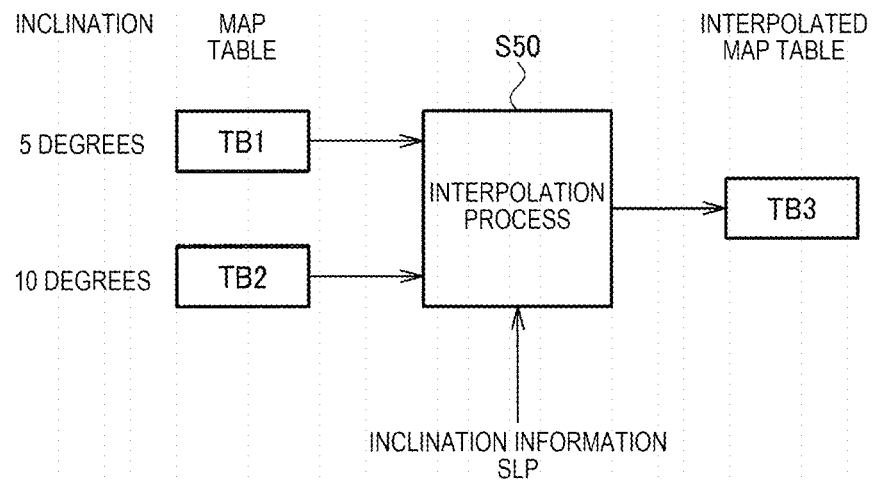
FIG. 8 is a diagram for describing a process of interpolating a map table.

FIG. 8 is a diagram for describing a process of interpolating a map table. The first mapping information MPA1 used by the first processing circuit 131 includes a first map table TB1 corresponding to a first inclination angle and a second table TB2 corresponding to a second inclination angle. In FIG. 8, the first inclination angle is 5 degrees and the second inclination angle is 10 degrees.

The first processing circuit 131 performs an interpolation process S50 based on the first map table TB1 and the second map table TB2 to generate a third map table TB3 corresponding to a third inclination angle and performs the first mapping process based on the third map table TB3. Specifically, the processing device 200 writes an inclination information SLP indicating the third inclination angle into the register circuit 170 via the interface 190. The first processing circuit 131 performs the interpolation process S50 based on the inclination information SLP written in the register circuit 170.

The interpolation process S50 is a process of obtaining the third map table from the first map table TB1 and the second map table TB2 by linear interpolation. For example, taking the map table of FIG. 4 as an example, the target coordinates (XTi, YTi) of the first map table TB1 and the target coordinates (XTi, YTi) of the second map table TB2 are different depending on the inclination angle. The first processing circuit 131 obtains target coordinates (XTi, YTi) of the third map table from the target coordinates (XTi, YTi) of the first map table TB1 and the target coordinates (XTi, YTi) of the second map table TB2 by linear interpolation. In addition, the first processing circuit 131 may perform higher-order interpolation such as cubic spline interpolation by using three or more map tables.

The second processing circuit 132 also performs a similar interpolation process. That is, the second mapping information MPA2 includes a fourth map table corresponding to the first inclination angle and a fifth map table corresponding to the second inclination angle. The second processing circuit 132 performs an interpolation process based on the fourth map table and the fifth map table to generate a sixth map table corresponding to the third inclination angle and performs the second mapping process based on the sixth map table.

4. Process of Comparing One Color Component in Each Frame for Each Color

The comparison circuit 145 performs image comparison in one or a plurality of frames. Hereinafter, "each frame" refers to a frame for image comparison. The comparison circuit 145 may compare all the color components of the image in each frame to be compared, or may compare one color component of the image in each frame for each color.

Figure 9:
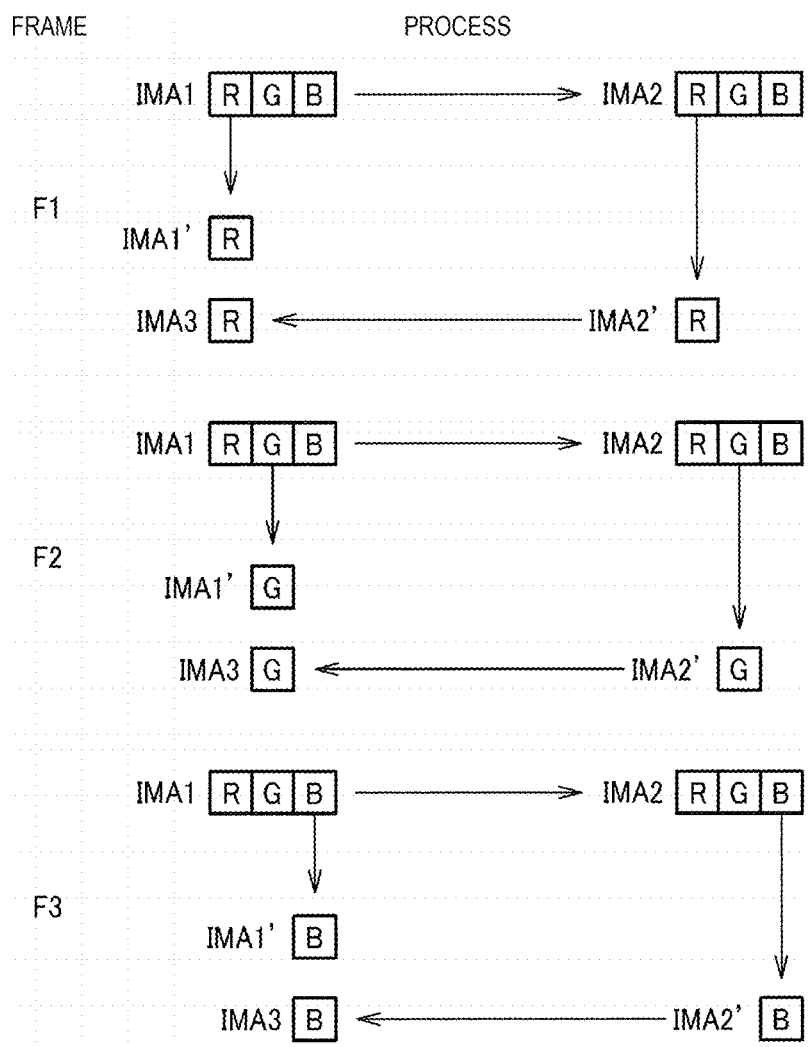
FIG. 9 is a diagram for describing a process when comparing one color component of an image in each frame for each color.

FIG. 9 is a diagram for describing a process when comparing one color component of the image in each frame for each color. In FIG. 9 an R component, a G component, and a B component of the image are a first color component, a second color component, and a third color component, respectively, but the color components are not limited to this. For example, the first color component, the second color component, and the third color component may be a Y component, a Cr component, and a Cb component. In FIG. 9, image comparison is performed for each frame, and processes in frames F1 to F3 are repeated after a frame F4.

In the frame F1, the first processing circuit 131 performs the first mapping process and the first rotation process on the RGB components of the image IMA1, and outputs the RGB components of the image IMA2. The above processes are the same for the frames F2 and F3.

In the frame F1, the first processing circuit 131 extracts the ROI from the R component of the image IMA1 and outputs the R component of the image IMA1'. The second processing circuit 132 extracts the ROI from the R component of the image IMA2, outputs the R component of the image IMA2', performs the second mapping process and the second rotation process on the R component of the image IMA2', and outputs the R component of IMA3. The comparison circuit 145 compares the R component of the image IMA3' and the R component of the image IMA3. In the frame F2, the first processing circuit 131, the second processing circuit 132, and the comparison circuit 145 perform processes similar to the above on the G component. In the frame F3, the first processing circuit 131, the second processing circuit 132, and the comparison circuit 145 perform processes similar to the above on the B component.

According to the embodiment of FIG. 9, only one color component of the image of the ROI is generated in each frame, and image comparison is performed for the one color component. As a result, the processing load of the second mapping process and the second rotation process performed by the second processing circuit 132 and the processing load of the comparison process performed by the comparison circuit 145 are reduced as compared to the case where image comparison of all color components is performed in each frame.

5. Image Comparison

Image comparison performed by the comparison circuit 145 will be described.

Figure 10:
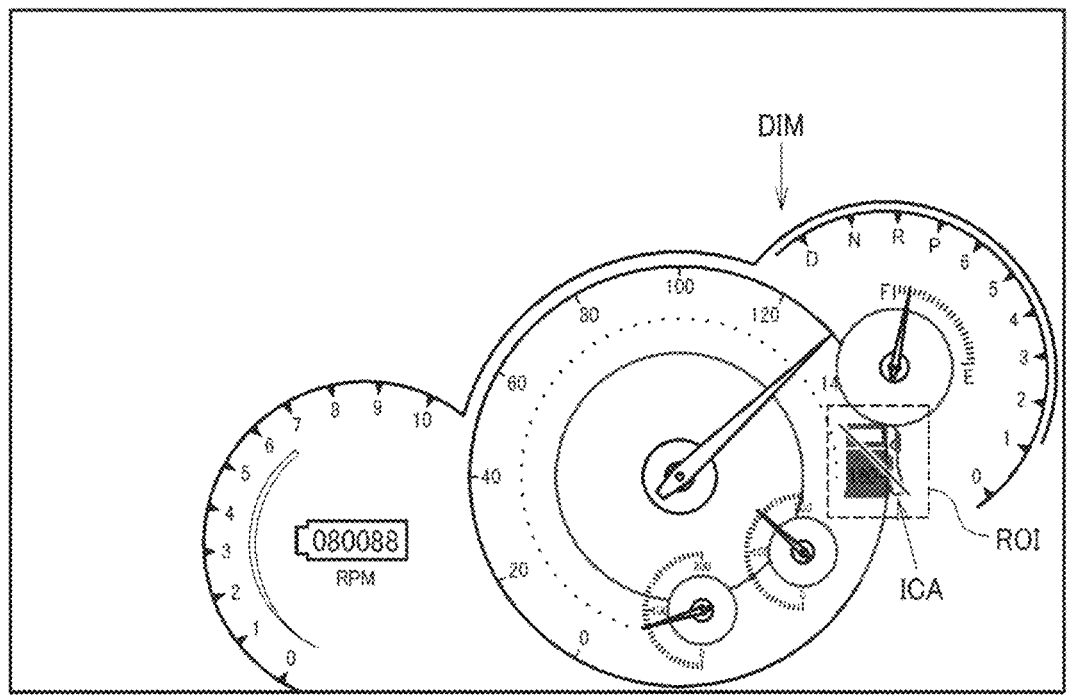
FIG. 10 shows an example of an image displayed on the head up display.

FIG. 10 shows an example of the image IMA2 displayed on the head up display. In FIG. 10, an icon ICA is overlapped on a meter image DIM. The icon ICA is blended into the meter image DIM with a certain transmittance. In the present embodiment, the circuit device 100 verifies whether or not the icon ICA is appropriately displayed. In this case, as indicated by the dotted rectangle in FIG. 10, the region including the icon ICA is set as the ROI.

Figure 11:
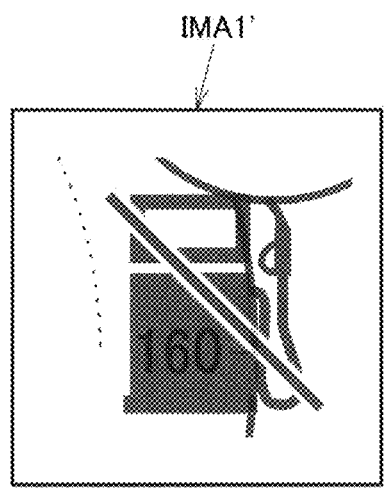
FIG. 11 is an image of a region of interest (ROI) extracted from the image before a mapping process.
Figure 12:
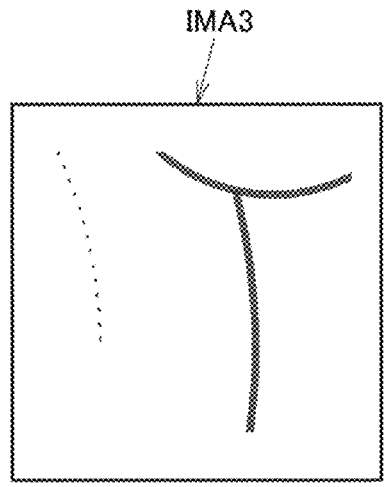
FIG. 12 is an image obtained by performing a reverse mapping process on the image of the ROI extracted from the image displayed on the head up display.

FIG. 11 is an image IMA1' of the ROI extracted from the image IMA1 before the mapping process. The ROI includes the icon ICA and the meter image DIM that is a background image of the icon ICA. FIG. 12 is an image IMA3 obtained by performing a reverse mapping process on the image IMA2' of the ROI extracted from the image IMA2. FIG. 12 shows an example in which the icon ICA is not correctly displayed. In this case, the image IMA1' and the image IMA3 have the same background image only, and different icon ICA portions. Therefore, the similarity indicated by the index as the comparison result is low. In the image IMA3, when the icon ICA is correctly displayed, the similarity is high. The index indicating the similarity can take a continuous or stepwise value. Although the error detection circuit 150 compares the index with threshold, it is possible to adjust the allowable degree of similarity by adjusting the threshold.

The comparison circuit 145 obtains a shape index, a visibility index, or both as an index indicating the similarity between the image IMA1' and the image IMA3. As described above, the comparison circuit 145 may obtain SSD, SAD, NCC, or the like as an index. Note that, whether the index increases as the degree of similarity increases, or whether the index decreases as the degree of similarity increases, depends on the index calculation method. The threshold is set for each of the shape index and the visibility index.

First, a first calculation method of the shape index will be described. The comparison circuit 145 obtains an inter-image distance between the image IMA1' and the image IMA3 in the color space. The color space is, for example, RGB or YCrCb. Specifically, the comparison circuit 145 obtains a square value of the distance between a pixel of the image IMA1' and a pixel of the image IMA3 corresponding to the pixel of the image IMA1' in the color space. The comparison circuit 145 accumulates the square value in the image and sets the accumulated value as the inter-image distance. In the first calculation method, the inter-image distance corresponds to the shape index.

Figure 13:
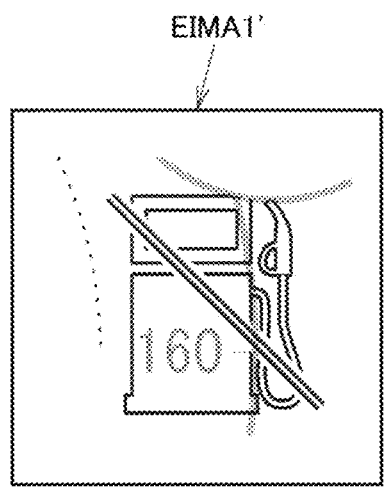
FIG. 13 shows an example of an edge image.

Next, a second calculation method of the shape index will be described. As shown in FIG. 13, the comparison circuit 145 obtains an edge image EIMA1' by extracting an edge of the image IMA1'. In addition, the comparison circuit 145 obtains an edge image of the image IMA3 by extracting an edge of the image IMA3. Hereinafter, the edge image of the image IMA3 is referred to as EIMA3. The comparison circuit 145 compares the edge image EIMA1' and the edge image EIMA3. Specifically, the comparison circuit 145 extracts edges from the image IMA1' and the image IMA3 by using a Sobel filter or the like, and obtains a correlation value between the edge image EIMA1' and the edge image EIMA3. In the second calculation method, the correlation value between the edge images corresponds to the shape index.

Next, a calculation method of the visibility index will be described. Here, the color space is YCrCb, but the color space may be RGB or the like. The comparison circuit 145 obtains a histogram from a Y channel of the image IMA1'. Similarly, the comparison circuit 145 obtains a histogram from a Cr channel and Cb channel of the image IMA1', and obtains a histogram from a Y channel, Cr channel, and Cb channel of the image IMA3.

The comparison circuit 145 performs a cross-correlation operation on the histograms of the image IMA1' and the image IMA3 in the Y channel. The cross-correlation operation is an operation in which two histograms are shifted by a lag to obtain a correlation value, and the correlation value is obtained while changing the lag. When the lag is changed and the correlation value between the two histograms becomes high, the lag has a peak. There may be a plurality of peaks. Similarly, the comparison circuit 145 performs a cross-correlation operation on the histograms of the image IMA1' and the image IMA3 in the Cr channel and the Cb channel.

The comparison circuit 145 checks lag values having a peak in cross-correlation signals of all channels, and obtains the maximum lag value among the lag values. The maximum lag value corresponds to the visibility index. When the color contrast between the icon and the background image is high, the maximum lag value increases, and thus the visibility index indicates the color contrast between the icon and the background image. It is considered that the higher the color contrast is, the higher the visibility is. Therefore, it is determined that the similarity is higher as the visibility index is larger.

By using the shape index, the visibility index, or the both described above, the similarity between the image IMA1' and the image IMA3 of the ROI can be determined. In a case where the shape index is used, the similarity is the highest when the image IMA1' and the image IMA3 match with each other. That is, the similarity can be paraphrased as the degree of coincidence. For example, when the icon ICA is rotated and displayed, the similarity is lower than when the icon ICA is not rotated. Meanwhile, since the visibility index indicates the color contrast, the similarity does not change much even when the icon ICA is rotated. Therefore, the visibility index may be used when allowing the case where the icon ICA is rotated. In addition, since the calculation method is different between the shape index and the visibility index, the accuracy of error detection can be improved by using the shape index and the visibility index.

6. Electronic Device and Vehicle

Figure 14:
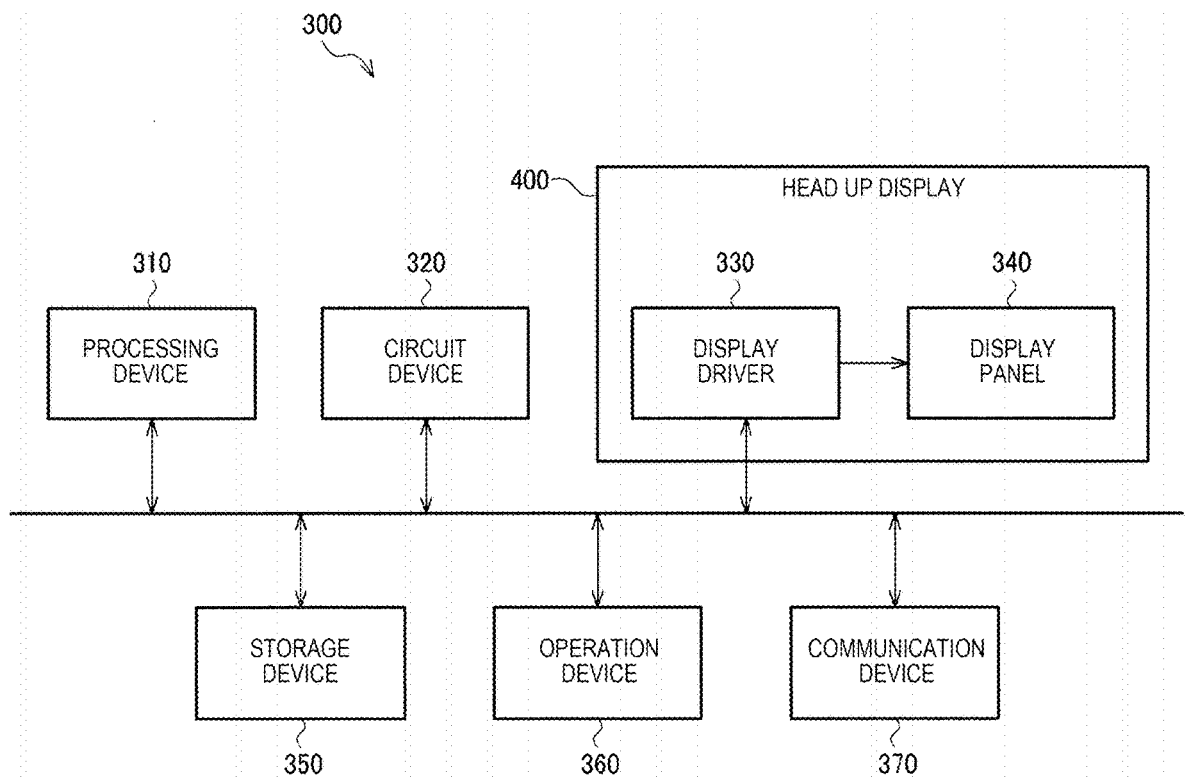
FIG. 14 shows a configuration example of an electronic device.

FIG. 14 is a configuration example of an electronic device including the circuit device according to the present embodiment. An electronic device 300 includes a processing device 310, a circuit device 320, a storage device 350, an operation device 360, a communication device 370, and a head up display 400. The circuit device 320 corresponds to the circuit device 100 in FIG. 1, and the processing device 310 corresponds to the processing device 200 in FIG. 1. The head up display 400 includes a display driver 330 and a display panel 340. The processing device 310 is, for example, an MCU. In the configuration example of FIG. 14, the circuit device 320 corresponds to a display controller. However, the error detection method of the present embodiment is applicable not only to a display controller but also to a circuit device that generates a display image for a head up display.

The processing device 310 transfers the image data stored in the storage device 350 or the image data received by the communication device 370 to the circuit device 320. The circuit device 320 performs an image process on image data, display timing control, generation of image data to be transferred to a display driver, error detection of the image data, and the like. The display driver 330 drives the display panel 340 based on the image data transferred from the circuit device 320 and the display timing control by the circuit device 320 to display an image. The display panel 340 is, for example, a liquid crystal display panel or an EL display Panel. The storage device 350 is, for example, a memory, a hard disk drive, an optical disk drive, or the like. The operation device 360 is a device for the user to operate the electronic device 300, and is, for example, a button, a touch panel, a keyboard, or the like. The communication device 370 is, for example, device that performs wired communication or a device that performs wireless communication. The wired communication is, for example, a LAN or USB. The wireless communication is, for example, a wireless LAN or wireless proximity communication.

As the electronic device including the circuit device according to the present embodiment, various devices such as an in-vehicle electronic device, a display terminal such as a factory facility, a display device mounted on a robot, or an information processing device can be assumed. The in-vehicle electronic device is, for example, a meter panel. The information processing device is, for example, a PC.

Figure 15:
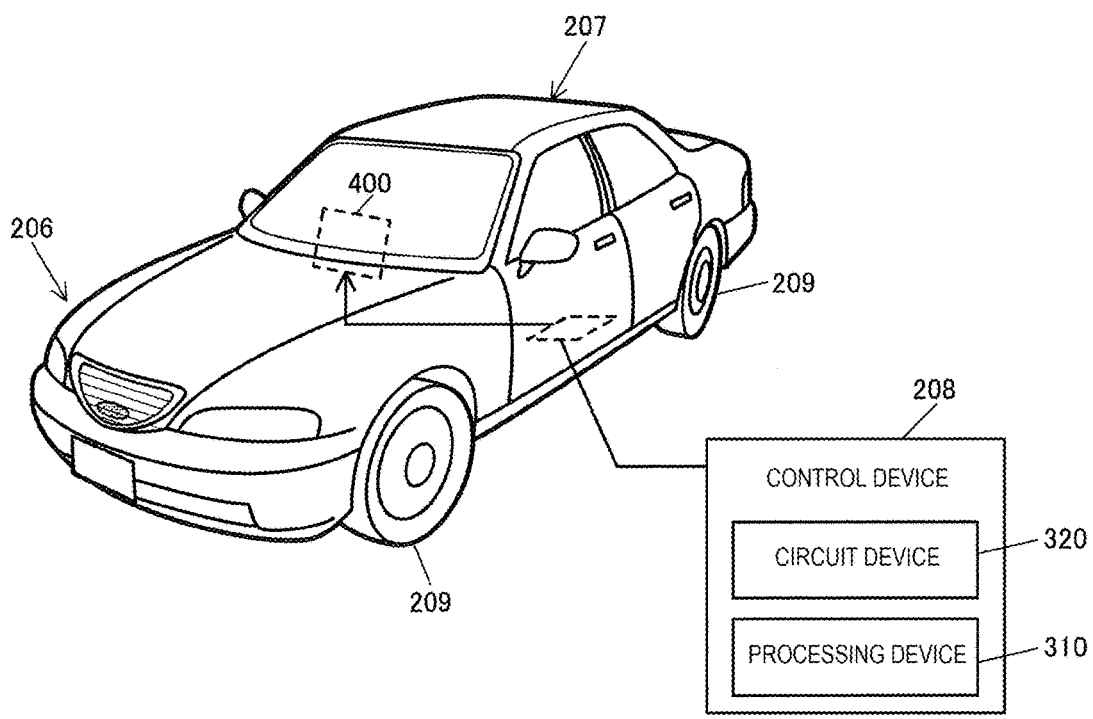
FIG. 15 shows an example of a vehicle.

FIG. 15 is an example of a vehicle including the circuit device 320 according to the present embodiment. The vehicle includes the circuit device 320 according to the present embodiment and the processing device 310 that transmits image data to the circuit device 320. The processing device 310 may perform an error handling process based on the error detection result of the display image for the head up display from the circuit device 320. The vehicle includes the head up display 400 and a control device 208. The control device 208 is an electronic control unit (ECU), and the circuit device 320 and the processing device 310 are incorporated in the ECU. The circuit device 320 may be incorporated in the head up display 400. The circuit device 320 according to the present embodiment can be incorporated in various vehicles such as a car, an airplane, a motorcycle, a bicycle, or a ship. The vehicle is, for example, a device or apparatus that moves on the ground, in the sky, or on the sea, including a driving mechanism such as an engine or motor, a steering mechanism such as a steering wheel or rudder, and various electronic devices. FIG. 15 schematically shows an automobile 206 as a specific example of the vehicle. The head up display 400 has a transparent screen, and the transparent screen is installed between the driver's seat and the windshield. Alternatively, the head up display may use a windshield as a transparent screen and project an image on the windshield. The head up display 400 functions as a meter panel of the automobile 206, for example.

The circuit device according to the present embodiment described above includes the image processing circuit and the comparison circuit. The image processing circuit performs the first mapping process and the first rotation process on the input first image to generate the second image for the head up display. The image processing circuit performs, on the second image, the second mapping process that is the reverse mapping process of the first mapping process and the second rotation process that is the reverse rotation process of the first rotation process to generate the third image. The comparison circuit performs a comparison between the first image and the third image and outputs a result of the comparison as information for detecting an error in the second image.

In this way, even when the image displayed on the head up display is rotated, it is possible to verify whether the rotated image is appropriate. That is, since the image processing circuit performs, on the second image, the reverse mapping process of the first mapping process and the reverse rotation process of the first rotation process, when the second image is normal, the third image is to return to the same image as the first image. The comparison circuit can output information for detecting the error of the second image by comparing the third image and the first image.

In the present embodiment, the comparison circuit may perform the comparison between the first image and the third image in a region of interest.

In this way, error detection can be performed only for the region of interest in the image displayed on the head up display. As a result, the number of pixels of the image handled in the second mapping process and the second rotation process is reduced, so that the processing load on the image processing circuit is reduced. In addition, the number of pixels of the image handled in the comparison process is reduced, so that the processing load on the comparison circuit is reduced.

In the present embodiment, the circuit device may include a first storage unit. The image processing circuit may extract an image of the region of interest in the first image to store the extracted image in the first storage unit. The comparison circuit may perform a comparison between the image of the region of interest in the first image, which is stored in the first storage unit, and the third image.

An operation time is required for the first processing circuit to perform the mapping process on the first image to generate the second image, and for the second processing circuit to perform the reverse mapping process on the second image to generate the third image. According to the present embodiment, the first storage unit can temporarily store the first image to be compared with the third image during the operation time.

In the present embodiment, the image processing circuit may have a first processing circuit that performs the first mapping process and the first rotation process, and a second processing circuit that performs the second mapping process and the second rotation process.

In this way, an error is detected when there is an abnormality in the first processing circuit or the second processing circuit. That is, when mapping and reverse mapping are performed in the same processing circuit, an abnormality that has occurred in mapping may be restored in reverse mapping, and the first image and the third image may be similar to each other. According to the present embodiment, an error can be reliably detected by independent processing circuits executing mapping and reverse mapping, respectively.

In the present embodiment, an image rotation in the second rotation process may be the same as an image rotation in the first rotation process in terms of a rotation center and an absolute value of a rotation angle, and be opposite to the image rotation in the first rotation process in terms of a rotation direction.

In this way, the image rotated in the first rotation process is reversely rotated in the second rotation process, thereby returning to the original image. An error can be detected by comparing the original image with the image before the first rotation process.

In the present embodiment, image rotations in the first rotation process and the second rotation process may have an axis intersecting a display surface of the head up display as a rotation axis.

The mounting angle of the head up display varies with respect to the mounting position of the head up display. Due to the variations in the mounting angle, the display image appears inclined to the user. The inclination corresponds to rotation about the axis intersecting the display surface as the rotation axis. In the present embodiment, it is possible to correct the inclination of the display image due to the variations in the mounting angle by rotating the image by the image process. In addition, an error can be detected even when rotation correction is performed by comparing the third image restored using reverse rotation with the first image that is the input image.

In the present embodiment, the circuit device may include a storage unit. The storage unit may store first rotation information defining an image rotation in the first rotation process and second rotation information defining an image rotation in the second rotation process. The image processing circuit may performing the first rotation process based on the first rotation information stored in the storage unit and perform the second rotation process based on the second rotation information stored in the storage unit.

That is, when the rotation process and reverse rotation process are performed based on the same rotation information, an abnormality that has occurred in the rotation process may be restored in the reverse rotation process, and the first image and the third image may be similar to each other. According to the present embodiment, the storage unit stores the first rotation information and the second rotation information as independent rotation information, so that an error can be reliably detected.

In the present embodiment, the storage unit may store first mapping information defining mapping in the first mapping process and second mapping information defining mapping in the second mapping process. The image processing circuit may perform the first mapping process based on the first mapping information and perform the second mapping process based on the second mapping information.

That is, when the mapping process and the reverse mapping process are performed based on the same mapping information, an abnormality that has occurred in the mapping process may be restored in the reverse mapping process, and the first image and the third image may be similar to each other. According to the present embodiment, the storage unit stores the first mapping information and the second mapping information as independent mapping information, so that an error can be reliably detected.

In the present embodiment, the first mapping information may include a first map table corresponding to a first inclination angle of a display surface of the head up display and a second map table corresponding to a second inclination angle of the display surface. The image processing circuit may perform an interpolation process based on the first map table and the second map table to generate a third map table corresponding to a third inclination angle of the display surface and may perform the first mapping process based on the third map table.

The distortion of the display image changes according to the inclination angle of the display surface in the depth direction. In the mapping process, mapping including the distortion according to the inclination angle is performed. According to the present embodiment, since the interpolation process based on the first map table corresponding to the first inclination angle and the second map table corresponding to the second inclination angle is performed, and thus the third map table corresponding to the third inclination angle of the display surface is generated, it is possible to correspond to various inclination angles. In addition, since the map table is generated by the interpolation process, the number of map tables stored in the storage unit can be reduced.

In the present embodiment, the second mapping information may include a fourth map table corresponding to the first inclination angle and a fifth map table corresponding to the second inclination angle. The image processing circuit may perform an interpolation process based on the fourth map table and the fifth map table to generate a sixth map table corresponding to the third inclination angle and may perform the second mapping process based on the sixth map table.

In this way, both the third map table and the sixth map table corresponding to the reverse mapping correspond to the third inclination angle. As a result, the third image returns to the same image as the first image by the reverse mapping using the sixth map table.

In the present embodiment, the image processing circuit may perform a reduction process on the second image, and perform the second mapping process and the second rotation process on the second image after the reduction process.

In this way, since the second image input to the second processing circuit becomes a reduced image, the processing load of the second mapping process and the second rotation process can be reduced.

In the present embodiment, the comparison circuit may perform the comparison between a first color component of the first image and a first color component of the third image in a first frame, and perform the comparison between a second color component of the first image and a second color component of the third image in a second frame.

In this way, since only one color component of the image is compared per frame, the load on the comparison circuit can be reduced compared to the case where all color components of the image are compared per frame.

In the present embodiment, the image processing circuit may perform the second mapping process and the second rotation process on the second image in the first frame to generate the first color component of the third image. The image processing circuit may perform the second mapping process and the second rotation process on a second color component of the second image in the second frame to generate the second color component of the third image.

In this way, since only one color component of the image per frame is subjected to the second mapping process and the second rotation process, the load on the second processing circuit can be reduced compared to the case where all the color components of the image per frame are subjected to the second mapping process and the second rotation process.

In the present embodiment, the comparison circuit may obtain an index indicating a similarity between the first image and the third image as a result of the comparison based on a pixel value of the first image and a pixel value of the third image or based on a pixel value of an edge image of the first image and a pixel value of an edge image of the third image.

When the similarity of the image is high, the pixel value of the first image and the pixel value of the third image is similar to each other, or the pixel value of the edge image of the first image and the pixel value of the edge image of the third image are similar to each other in the present embodiment, since the index is obtained based on the pixel value of the first image and the pixel value of the third image or based on the pixel value of the edge image of the first image and the pixel value of the edge image of the third image, the index indicates the similarity between the first image and the third image.

In the present embodiment, the circuit device may include an error detection circuit that detects the error in the second image by a comparison between the index and a threshold.

In this way, the circuit device detects an error in the second image based on the index, so that the circuit device can perform an error handling process based on the error detection result, or output the error detection result to the outside of the circuit device.

In addition, the electronic device according to the present embodiment includes the circuit device described in any of the above aspects.

In addition, the vehicle according to the present embodiment includes the circuit device described in any of the above aspects.

Although the present embodiment has been described in detail as described above, it will be easily understood by those skilled in the art that many modifications can be made without departing from the novel matters and effects of the present disclosure. Accordingly, all such modification examples are intended to be included within the scope of the present disclosure. For example, a term described at least once together with a different term having a broader meaning or the same meaning in the specification or the drawings can be replaced with the different term anywhere in the specification or the drawings. All combinations of the present embodiment and the modification examples are also included in the scope of the present disclosure. In addition, the configurations and operations of the circuit device, the head up display, the electronic device, and the vehicle are not limited to those described in the present embodiment, and various modifications can be made.

What is claimed is:
1. A circuit device comprising:
an image processing circuit that performs a first mapping process and a first rotation process on an input first image to generate a second image for a head up display and performs, on the second image, a second mapping process that is a reverse mapping process of the first mapping process and a second rotation process that is a reverse rotation process of the first rotation process to generate a third image;

a comparison circuit that performs a comparison between the first image and the third image and outputs a result of the comparison as information for detecting an error in the second image; and a second storage unit that stores first mapping information defining mapping in the first mapping process and second mapping information defining mapping in the second mapping process, wherein the image processing circuit performs the first mapping process based on the first mapping information stored in the second storage unit and performs the second mapping process based on the second mapping information stored in the second storage unit, the first mapping information includes a first map table corresponding to a first inclination angle of a display surface of the head up display and a second map table corresponding to a second inclination angle of the display surface, and the image processing circuit performs an interpolation process based on the first map table and the second map table to generate a third map table corresponding to a third inclination angle of the display surface and performs the first mapping process based on the third map table.

2. The circuit device according to claim 1, wherein the comparison circuit performs the comparison between the first image and the third image in a region of interest.

3. The circuit device according to claim 2, further comprising:

a first storage unit, wherein the image processing circuit extracts an image of the region of interest in the first image to store the extracted image in the first storage unit, and the comparison circuit performs a comparison between the image of the region of interest in the first image, which is stored in the first storage unit, and the third image.

4. The circuit device according to claim 1, wherein the image processing circuit has a first processing circuit that performs the first mapping process and the first rotation process, and a second processing circuit that performs the second mapping process and the second rotation process.

5. The circuit device according to claim 1, wherein an image rotation in the second rotation process is the same as an image rotation in the first rotation process in terms of a rotation center and an absolute value of a rotation angle, and is opposite to the image rotation in the first rotation process in terms of a rotation direction.

6. The circuit device according to claim 1, wherein image rotations in the first rotation process and the second rotation process have an axis intersecting a display surface of the head up display as a rotation axis.

7. The circuit device according to claim 1, further comprising:

a second storage unit that stores first rotation information defining an image rotation in the first rotation process and second rotation information defining an image rotation in the second rotation process, wherein the image processing circuit performs the first rotation process based on the first rotation information stored in the second storage unit and performs the second rotation process based on the second rotation information stored in the second storage unit.

8. The circuit device according to claim 1, wherein the second mapping information includes a fourth map table corresponding to the first inclination angle and a fifth map table corresponding to the second inclination angle, and the image processing circuit performs an interpolation process based on the fourth map table and the fifth map table to generate a sixth map table corresponding to the third inclination angle and performs the second mapping process based on the sixth map table.

9. The circuit device according to claim 1, wherein the comparison circuit performs the comparison between a first color component of the first image and a first color component of the third image in a first frame, and performs the comparison between a second color component of the first image and a second color component of the third image in a second frame.

10. The circuit device according to claim 9, wherein the image processing circuit performs the second mapping process and the second rotation process on a first color component of the second image in the first frame to generate the first color component of the third image and performs the second mapping process and the second rotation process on a second color component of the second image in the second frame to generate the second color component of the third image.

11. An electronic device comprising the circuit device according to claim 1.

12. A vehicle comprising the circuit device according to claim 1.

13. A circuit device comprising:

an image processing circuit that performs a first mapping process and a first rotation process on an input first image to generate a second image for a head up display and performs, on the second image, a second mapping process that is a reverse mapping process of the first mapping process and a second rotation process that is a reverse rotation process of the first rotation process to generate a third image; and a comparison circuit that performs a comparison between the first image and the third image and outputs a result of the comparison as information for detecting an error in the second image, wherein the image processing circuit performs a reduction process on the second image, and performs the second mapping process and the second rotation process on the second image after the reduction process.

14. A circuit device comprising:

an image processing circuit that performs a first mapping process and a first rotation process on an input first image to generate a second image for a head up display and performs, on the second image, a second mapping process that is a reverse mapping process of the first mapping process and a second rotation process that is a reverse rotation process of the first rotation process to generate a third image; and a comparison circuit that performs a comparison between the first image and the third image and outputs a result of the comparison as information for detecting an error in the second image, wherein the comparison circuit obtains an index indicating a similarity between the first image and the third image as a result of the comparison based on a pixel value of the first image and a pixel value of the third image or based on a pixel value of an edge image of the first image and a pixel value of an edge image of the third image.

15. The circuit device according to claim 14, further comprising:
an error detection circuit that detects the error in the second image by a comparison between the index and a threshold.

* * * * *